(12) United States Patent
Casado Merino et al.

(10) Patent No.: US 12,227,304 B2
(45) Date of Patent: Feb. 18, 2025

(54) METHOD OF AUTOMATED UNDOCKING A PASSENGER BOARDING BRIDGE FROM AN AIRCRAFT

(71) Applicant: TK Airport Solutions, S.A., Mieres (ES)

(72) Inventors: Juan Maria Casado Merino, Santiago de Compostela (ES); Antonio Murias Bermejo, Gijón (ES); Eduardo Perez Vazquez, Asturias (ES); Eduardo Fernandez Garciá, Asturias (ES)

(73) Assignee: TK Airport Solutions, S.A., Mieres (ES)

( * ) Notice: Subject to any disclaimer, the term of this patent is extended or adjusted under 35 U.S.C. 154(b) by 0 days.

(21) Appl. No.: 17/250,218

(22) PCT Filed: Jun. 26, 2019

(86) PCT No.: PCT/EP2019/066963
§ 371 (c)(1),
(2) Date: Dec. 16, 2020

(87) PCT Pub. No.: WO2020/002405
PCT Pub. Date: Jan. 2, 2020

(65) Prior Publication Data
US 2021/0253271 A1  Aug. 19, 2021

(30) Foreign Application Priority Data

Jun. 27, 2018  (EP) .................................. 18382477
Jul. 27, 2018  (DE) ........................ 102018212530.9

(51) Int. Cl.
*B64F 1/305*  (2006.01)

(52) U.S. Cl.
CPC .................. *B64F 1/3055* (2013.01)

(58) Field of Classification Search
CPC ................................... B64F 1/3055
USPC .......................................... 14/71.5
See application file for complete search history.

(56) References Cited

U.S. PATENT DOCUMENTS

| 3,060,471 | A  | * | 10/1962 | Frank | B64F 1/3055 |
| | | | | | 14/71.5 |
| 6,929,217 | B2 | * | 8/2005 | Greaves | B64F 1/30 |
| | | | | | 52/33 |
| 2002/0104176 | A1 | * | 8/2002 | Thomas | B64F 1/305 |
| | | | | | 14/71.5 |

(Continued)

FOREIGN PATENT DOCUMENTS

| CA | 2240042 | * 12/1998 | ............. B64F 1/305 |
| CA | 2418523 C | 1/2008 | |

(Continued)

OTHER PUBLICATIONS

International Search Report dated Sep. 9, 2019 for International Application No. PCT/EP2019/066963, citing references listed above.

*Primary Examiner* — Raymond W Addie
(74) *Attorney, Agent, or Firm* — Dinsmore & Shohl LLP (57) ABSTRACT

A method for automatically undocking a passenger boarding bridge that is located in a docked position at a door of an aircraft, includes detecting a start signal to start the undocking procedure, confirming safety conditions, and automatically moving the passenger boarding bridge from the docking position to a parking position.

20 Claims, 10 Drawing Sheets

(56) References Cited

U.S. PATENT DOCUMENTS

| | | | |
|---|---|---|---|
| 2003/0057360 A1* | 3/2003 | Anderberg | B64F 1/3055 250/221 |
| 2003/0145403 A1* | 8/2003 | Hutton | B64F 1/305 14/71.5 |
| 2003/0208861 A1* | 11/2003 | Hutton | B64F 1/3055 14/71.5 |
| 2004/0187234 A1* | 9/2004 | Hutton | G08G 5/0013 14/71.5 |
| 2004/0188975 A1* | 9/2004 | Yoshimoto | B62K 25/08 280/276 |
| 2008/0065271 A1* | 3/2008 | Hutton | B64F 1/3055 701/1 |
| 2008/0229525 A1* | 9/2008 | Hutton | B64F 1/002 14/71.5 |
| 2008/0231472 A1* | 9/2008 | Hutton | G08G 5/065 340/958 |
| 2009/0119854 A1* | 5/2009 | Nelson | B64F 1/305 14/71.5 |
| 2015/0151834 A1 | 6/2015 | Cox et al. | |
| 2023/0109013 A1* | 4/2023 | Dobashi | B64F 1/305 14/71.5 |

FOREIGN PATENT DOCUMENTS

| | | | |
|---|---|---|---|
| CN | 101287649 A | 10/2008 | |
| CN | 202201171 U | 4/2012 | |
| WO | WO-2018034615 A1 * | 2/2018 | B64F 1/30 |

* cited by examiner

METHOD OF AUTOMATED UNDOCKING A PASSENGER BOARDING BRIDGE FROM AN AIRCRAFT

CROSS REFERENCE TO RELATED APPLICATIONS

This application is a U.S. National Stage Entry of International Patent Application Serial Number PCT/EP2019/066963, filed Jun. 26, 2019, which claims priority to both of German Patent Application No. DE 10 2018 212 530.9, filed Jul. 27, 2018, and to European Patent Application No. EP 18382477.0, filed Jun. 27, 2018, the entire contents of each of which are incorporated herein by reference.

FIELD

The present disclosure generally relates to passenger boarding bridges for aircraft, including a method for automated undocking of a passenger boarding bridge from an aircraft.

BACKGROUND

Conventional passenger boarding bridges are docked and undocked manually. That means that an operator is controlling the movement of the passenger boarding bridge giving driving commands e.g. through a joystick. Here the operator has direct influence onto the speed and direction of the drive means.

The conventional method occupies a person which is costly. Therefore there is a need for reducing the cost.

CA 2 418 523 C discloses a method, in which the undocking procedure is only partially automated. Therefore, there is a further need, not only for an improved method that will reduce cost, but for an improved and automated method of undocking a passenger boarding bridge from an aircraft.

DETAILED DESCRIPTION

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The present disclosure generally relates to a passenger boarding bridge and a method of automatically undocking a passenger boarding bridge from an aircraft.

In the inventive method the aircraft has a fuselage and a door. The passenger boarding bridge is initially located in a docked position, wherein a bridgehead of the passenger boarding bridge is aligned to the door, so that passengers can enter or leave the plane via the bridgehead. The method comprising the following steps: Detecting a start signal to start the undocking procedure; Confirming safety conditions, automatically Moving the passenger boarding bridge from the docking position to a parking position.

Automatically means in this context, that the movement is controlled by a computer, wherein in particular the speed and the direction of the movement is controlled by the computer, not by an operator. An operator may generally start or stop movement by providing a start signal or by pressing an emergency stop button. But the manner, in which the movement is performed, is defined by the computer. By automating also the undocking procedure it is not required to wait for a qualified operator for starting undocking; instead the operation can be started by an operator who is not qualified for manual undocking or the operation can be started from a remote location. Both possibilities lead to more flexibility in planning the daily routine at an airport and consequently to a reduction of cost.

In an embodiment a trajectory is established, in particular calculated, based on the coordinates of the starting position and of the parking position, wherein the trajectory defines the movement of the passenger boarding bridge. Subsequently the passenger boarding bridge is moved from the starting position to the parking position along the established trajectory. In particular the trajectory comprises a path. The path may comprise a number of coordinates of points to be passed by a certain component of the passenger boarding bridge during movement. The component may be the drive unit. Additionally the trajectory may comprise an orientation allocated to the path, which defines the direction of the bridgehead during movement.

It is advantageous, if the risk of damage to the fuselage is reduced during automatic undocking. Therefore the invention proposes the following embodiments.

In an embodiment the movement of the passenger boarding bridge is controlled in a manner, in particular that the trajectory is established in a manner, that as long as the bridgehead is still within a safety distance from the aircraft, a direction of movement of the bridgehead is perpendicular to a direction of the fuselage. That means in particular, that the bridgehead is performing a movement away from the fuselage, in a direction orthogonal to the fuselage in the area of the door.

In an embodiment the movement of the passenger boarding bridge is controlled in a manner, in particular that the trajectory is established in a manner, that as long as the bridgehead is still within a predetermined safety distance from the aircraft, an approaching edge of the bridgehead is aligned parallel to the aircraft fuselage, when viewed in top view, in particular that an orientation of the bridgehead is perpendicular to the fuselage of the aircraft.

In an embodiment in a first phase of movement the bridgehead is controlled in a manner, that as long as the approaching edge is still within a predetermined safety distance from the aircraft, a direction of orientation of a direction of the bridgehead and a direction of the tunnel is continuously readjusted, so that the orientation of the approaching edge is held parallel to the direction of the fuselage. Readjusting may be required since the direction of the tunnel T may change during movement.

In an embodiment the bridgehead is controlled in a manner that as long as the bridgehead is still within a predetermined safety distance from the aircraft, a height of the approaching edge of the bridgehead is not changed during movement. Since the conventional aircrafts fuselage has a bended cross-section in particular lifting and/or lowering the bridgehead may lead to a collision between the bridgehead and the fuselage, what is to be prevented during undocking.

The safety distance may be at least 0.5 m. So for the first e.g. 0.5 m of movement, the parallel alignment and/or the height will not be changed. The distance from the aircraft is to be understood identically as the distance from the fuselage.

In an embodiment the method comprises the steps: Analyzing information of a next docking situation before undocking is finished; determining a parking position based on the analyzed next docking situation; Moving the passenger boarding bridge to the determined parking position. In particular the next docking situation comprises information about the next aircraft arriving at the gate and/or the designation of one of a plurality of centerlines at which the aircraft is to be parked. In particular the information of the next docking situation is provided by a database. The step of determining the determined parking position may comprise the step of selecting one parking position out of a plurality of predefined parking positions.

In particular the aforementioned steps are advantageous for MARS (Multiple Apron Ramp System) stands, in which aircrafts can be parked in various orientations. A MARS stand may comprise more than one centerline. The information of the next docking situation here comprises information about the aircraft type which is approaching the stand after the current aircraft is undocked and has left the stand.

In particular the stand has a plurality of stop positions and/or a plurality of centerlines. To each of the stop positions and/or of the centerlines out of the respective pluralities a next parking position is allocated. So during undocking the PBB is moved to the next parking position which is allocated to the stop position at which the next aircraft is to be parked.

Here the idea is, that already during undocking the passenger boarding bridge is brought into a selected parking position, which is advantageous for the subsequent docking procedure. This can safe time for the next docking procedure, thus enabling short handling time for an aircraft at all.

In an embodiment, in particular after the approaching edge has reached a safety distance from the aircraft, for reaching the parking position the tunnel is performing a rotation along a first rotation direction, and that the bridgehead is performing a rotation along a second rotation direction, which is contrary to the first rotation direction. Whilst no other information are available about the next docking situation by this steps the likelihood is increased that the door of the next aircraft will be in the field of view of the camera as early as possible. Consequently the next docking procedure can be improved.

In an embodiment a plurality of observation cameras is used to observe images of a safety area of the passenger boarding bridge. The observed images are presented to an operator at an operator station. The operator then issues an enabling signal, in particular by pressing a dead man switch, at the operator station. In this embodiment the, in particular final, decision on starting the undocking movement lies within the operator, which is a person. The images from the cameras may serve as a basis for this decision to initiate movement.

In an embodiment an observation procedure is running during movement. Here the observation procedure is configured to detect an object within a safety area of the passenger boarding bridge, in particular by picture recognition or by motion detectors, within a safety area of the passenger boarding bridge. The observation procedure issues a warning signal, in particular a stop signal, upon detection of an object entering the safety area.

In an embodiment an observation procedure is running during movement. Here the observation procedure is configured to detect an object, in particular unintentionally, approaching the safety area, in particular by using a proximity sensor. The observation procedure issues a warning signal, in particular a stop signal, upon detection of a unintentionally approaching object.

Observation by picture recognition can be performed by comparing an actual image of the safety areas with a stored picture without any objects. If any differences can be detected in the actual image, this may be caused by an object located within the safety area.

The camera used for automated docking can be an observation camera as well. The safety area may be a safety zone within the passenger boarding and/or a clearance zone around the drive means; the latter may be formed by a safety distance around the trajectory. In an embodiment the safety area may comprise an area around the engines of the aircraft and/or an area around the pitot tubes of an aircraft. In an embodiment the safety area may comprise an apron area, which should be of free of obstacles or persons.

The safety area may be any space within the area of influence of the passenger boarding bridge, wherein any event within this safety zone may bear a risk for damaging the bridge or injuries of persons approaching this zone. In an embodiment during movement a distance between the bridgehead and the fuselage is monitored, and if said distance is not increasing the movement is stopped. This steps serve as an additional safety feature. For example if the distance is not increasing, there may be a wrong orientation of the drive means present. Otherwise, for example if an orientation sensor delivers faulty values, this circumstance will not be noticed until the fuselage is damaged by the bridgehead unintentionally moving into a false direction.

In an embodiment the safety area incorporates also future positions of the passenger boarding bridge according to the established trajectory. Here the trajectory can be used to assess, whether an object is located at a position in which there is a risk of collision with the passenger boarding bridge. Any object, not having the risk of collision, may be neglected.

In an embodiment, before movement, an angle between a direction of the of drive relative to a direction of the tunnel is detected, and if said angle is outside of a predetermined range the movement of the drive in prohibited. This step improves safety against damage to the fuselage, because driving the bridgehead in an unwanted direction, in particular parallel to the fuselage, can be prevented.

In an embodiment, before movement, a direction of the drive is compared to a direction of known relation, in particular perpendicular, to the fuselage to a predetermined critical value. If the comparison exceeds a critical value, a movement of the drive in prohibited. Also here the risk of damage to the fuselage due to a false driving direction can be prevented.

Figure 8:
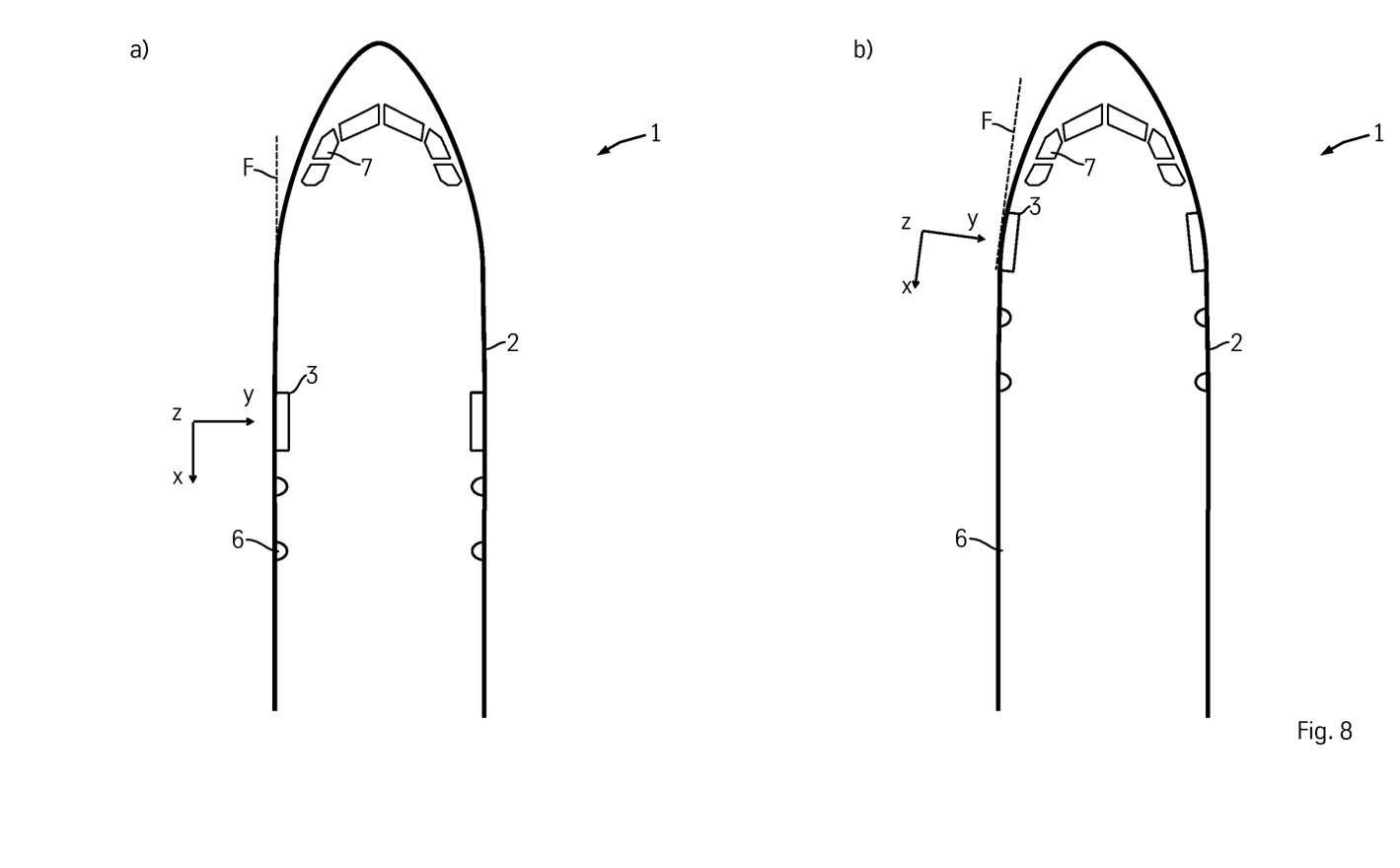
FIG. 8a) is a top schematic view of a portion of an aircraft to define a coordinate system in an embodiment of the present disclosure when the aircraft door is disposed along a straight longitudinal section of the aircraft fuselage.
FIG. 8b) is a top schematic view of a portion of an aircraft to define a coordinate system in an alternate embodiment of the present disclosure when the aircraft door is disposed in the curved nose section of the aircraft.

Within the scope of the present application a coordinate system is defined, which is relevant for the docking procedure (FIG. 8). Therein the direction x indicates a longitudinal direction parallel to the direction F of the fuselage 2 in the area of the door 3 to be docked. The direction y indicates the transverse direction perpendicular to the direction F of the fuselage in the area of the door. The difference between FIGS. 8a and 8b indicates, that the x- and y-direction may slightly differ from the airplane coordinate system in particular where the door 3 is located in the nose of the aircraft (FIG. 8b). The direction z indicates the height direction.

Figure 1:
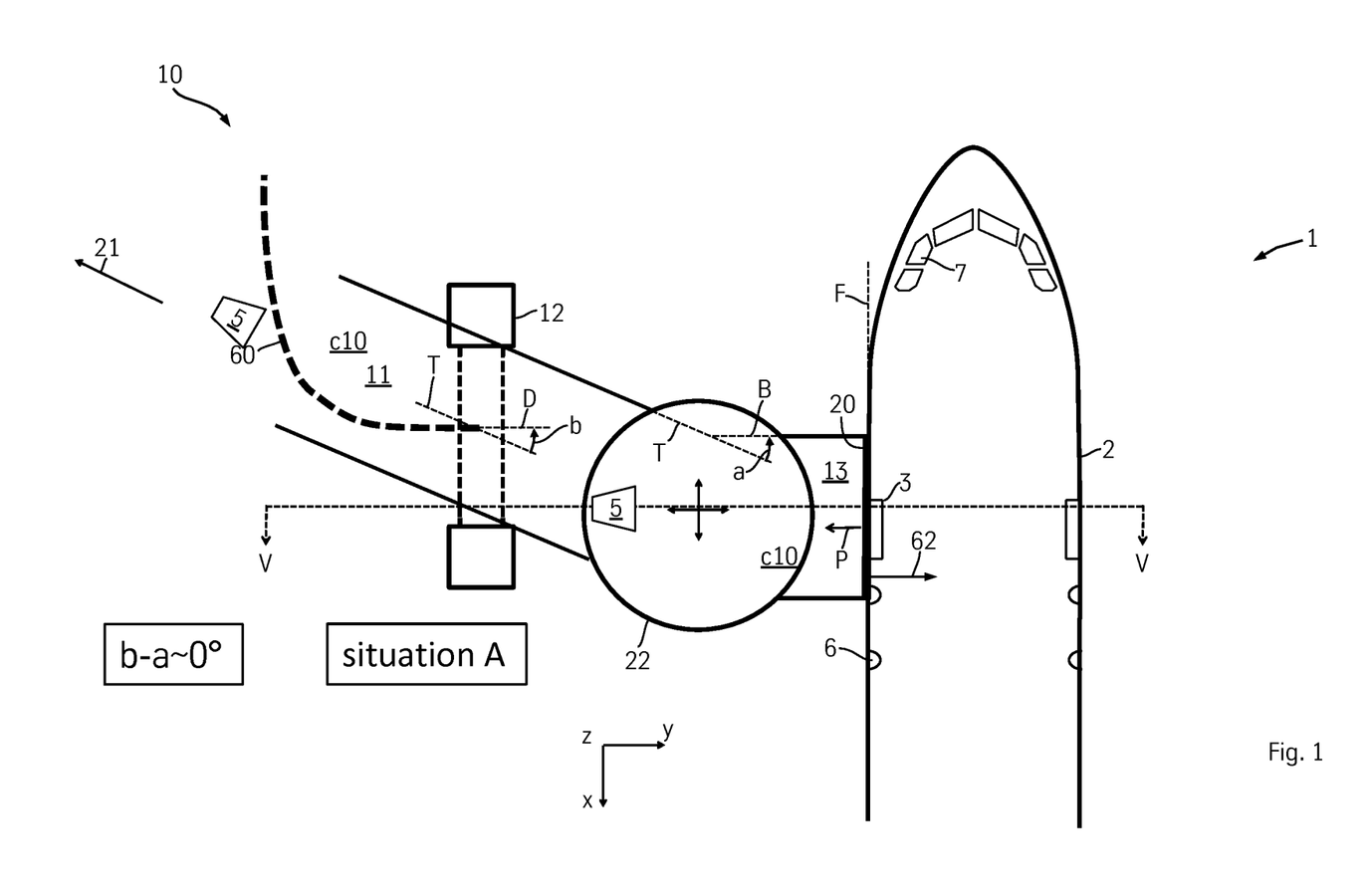
FIG. 1 is a schematic top view of a passenger boarding bridge of the present disclosure located in a docked position at a door of an aircraft, according to a first phase of an embodiment of the automated undocking procedure of the present disclosure.

A PBB 10 as shown in FIG. 1 comprises, as usual, a tunnel 11, which is on a first end connected in a conventional manner to an airport building (not shown). On a second end the PBB 10 comprises a bridgehead 13, which is to be brought into alignment with the aircraft door 3, so that passengers can leave the aircraft 1 via the door 3 and the tunnel 11, in direction 21 to the airport terminal building and vice versa.

Conventional drive means 12 are provided as to adjust the position of the bridgehead 13 by adapting the length and orientation of the tunnel 11. Therefor the drive unit can be moved, which has the effect on the position of the bridgehead. The drive unit 12 has a direction of drive D, depending on the orientation of the wheels. For changing the direction of drive the drive unit can be rotated. In particular the drive unit is rotated before movement to change the initial direction of drive before movement is started. The definition of the direction D of the drive 12 becomes clear from illustrations in the FIGS. 1 and 6. To change the orientation and length of the tunnel 11, and consequently the position of the bridgehead 13, the drive direction D can be varied by amending the orientation b between the drive 12 and the direction T of the tunnel 11/rotating the drive unit (see FIGS. 1 and 6).

Figure 5:
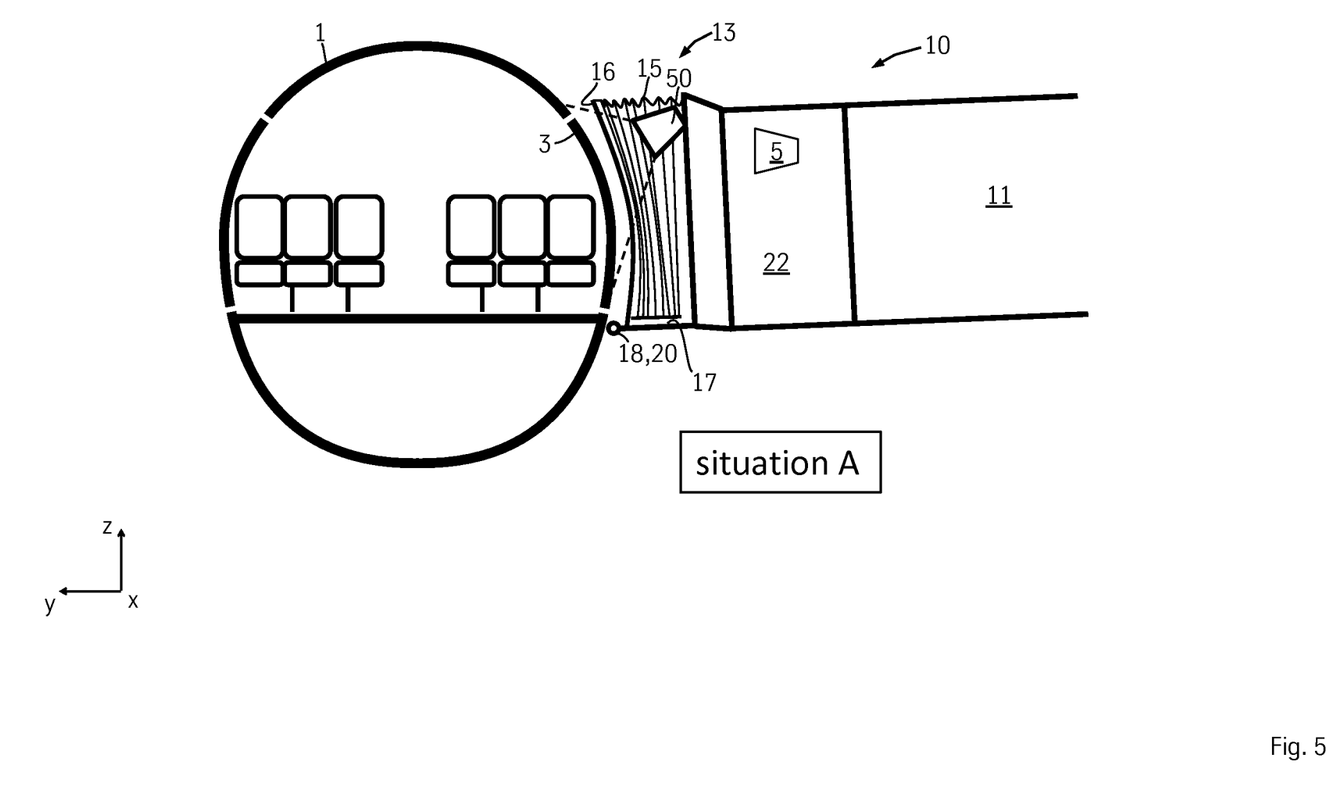
FIG. 5 is a cross section view through the passenger boarding bridge and aircraft of the FIG. 1, taken through the section line V-V of FIG. 1.

Additionally the relative angular orientation a between the direction B of the bridgehead 13 and a direction T of the tunnel 11 can be adapted, since a round cabin 22 is provided between the bridgehead 13 and the tunnel 11, constituting a swivel between the bridgehead 13 and the tunnel 11. When the bridgehead 13 is docked to the aircraft 1, an approaching edge 20 of the bridgehead floor 17, which may be constituted by a floor bumper 18 (see FIG. 5), is oriented parallel to the fuselage 2 of the aircraft.

The passenger boarding bridge is provided with conventional lifting means, so that the height of the bridgehead can be varied.

FIG. 1 shows the passenger boarding bridge 10 in a docked position (situation A). Before automatic undocking, several steps are required.

Observation cameras 5, some of which may be positioned within or outside of the passenger boarding bridge, observe a safety area of the passenger boarding bridge. The safety area may be any area within the PBB, in particular within the tunnel, the round cabin and/or the bridgehead, or in the vicinity of the PBB, at which no (unauthorized) person must be located or at which no unintentional obstacles must be located during automatic operation. So the safety area may be monitored by one or more cameras 5. Automatic detection procedures may be used to detect any unintended movement in the safety area. Also the unintended movement may be detected by movement sensors, in particular light barriers.

In particular an operator will give a signal that the passenger boarding bridge is allowed to move, e.g. by pressing a button, in particular a dead man button. The operator therefore gets a variety of information. For example images recorded by an observation camera 5 may be provided via a screen at an operator station to the operator. Based on the displayed information the operator is brought into the condition to allow or not allow starting of undocking procedure. In particular releasing a dead man button will lead to a stop of movement. The button may be a soft button on a screen.

Before undocking a relation between the drive direction and the fuselage is analyzed. This can be done with the help an angular sensors attached between the tunnel 11 and the drive means 12 and the tunnel 11 and the bridgehead 13. Therefrom the current drive direction D can be obtained. In the situation of FIG. 1 the drive direction D is in main parallel to the direction B of the bridgehead 13. Consequently the powering the drive means 12 would lead to a movement (arrow P) of the approaching edge 20 perpendicular to the fuselage 2 of the aircraft 1. Generally speaking the bridgehead direction 13 is understood as a direction perpendicular to the approaching edge 20; since in a properly docked PBB the approaching edge 20 is parallel to the direction F of the fuselage 2 in the area of the door, the direction B of the bridgehead 13 is considered as perpendicular to the direction F of the fuselage 2.

Figure 6:
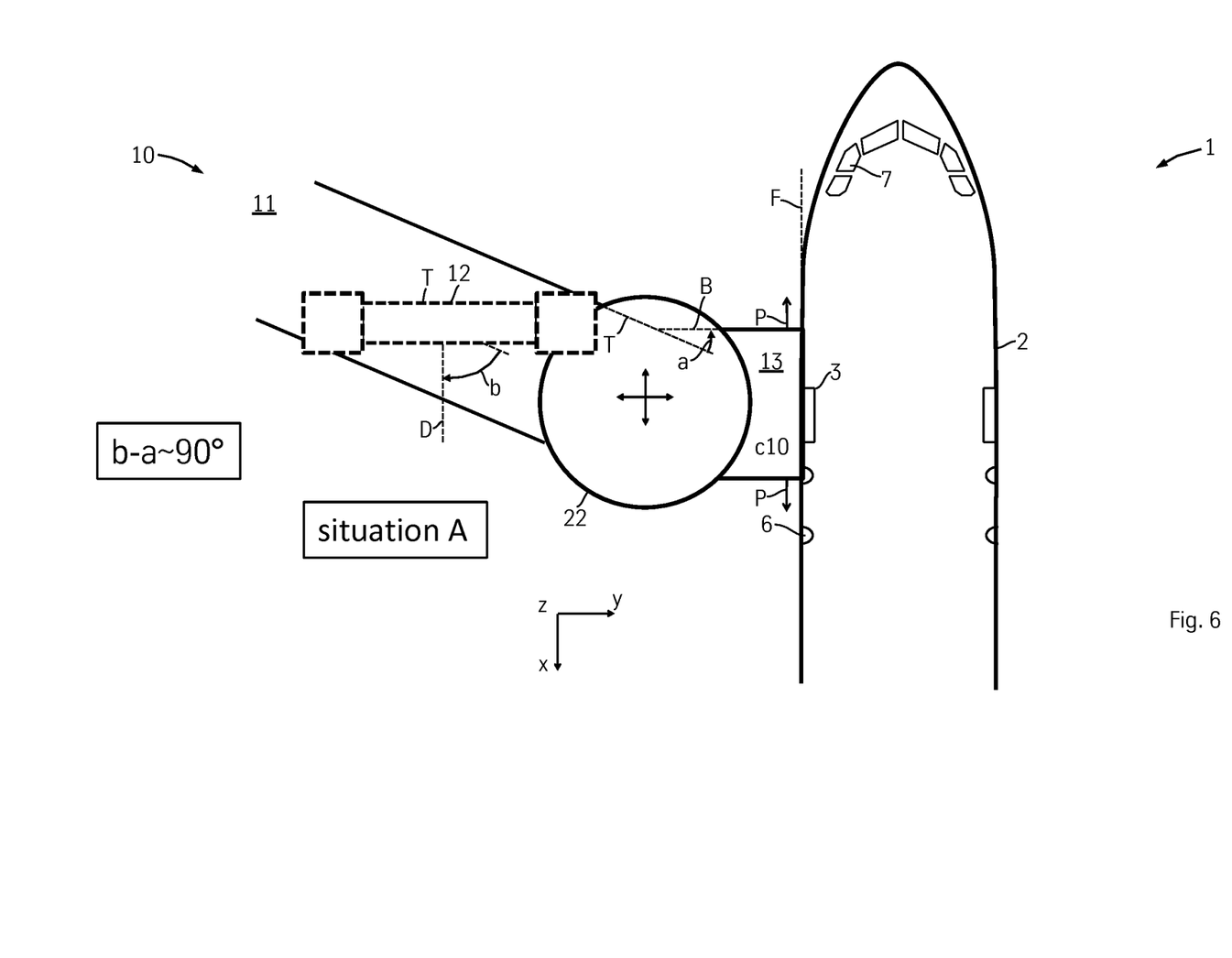
FIG. 6 is a schematic top view of a passenger boarding bridge of the present disclosure, located in a docked position at a door of an aircraft, according to a first phase of an alternate embodiment of the automated undocking procedure of the present disclosure.

In contrast thereto in FIG. 6 a situation is shown wherein the drive direction D is in main perpendicular to the direction B of the bridgehead 13. Powering the drive 12 would lead to a movement parallel to the fuselage 2. Here the risk of damage to the fuselage 2 is increased compared to the situation A of FIG. 1. Consequently the drive direction D is detected and analyzed, in particular compared to a critical value. When a situation as shown in FIG. 6 is detected, movement of the drive unit is disabled. Before movement of the drive unit the drive unit has to be rotated by about 90°. If the analysis leads to the conclusion that the drive direction is suitable for a safe movement of the bridgehead 13, the movement is enabled. The term rotation of the drive unit is not be considered as a movement of the drive unit within the meaning of the present application. But the drive unit may rotate during movement to change the direction of the movement.

For analyzing the relation between the drive direction D and the direction F of the fuselage 2, the angular orientation b between the drive 12 and the tunnel 11 and the angular orientation a between the tunnel 11 and the bridgehead 13 can be consulted, which are both obtained by sensors (not shown). In the preferred situation A of FIG. 1 the difference between the angular orientations b and a is 0. In a non-preferred situation A shown in FIG. 6 the difference between the angular orientations b and a is 90. If the difference between the angular orientations b and a is larger than a predetermined critical value (e.g. 30 degree), movement of the drive 12 is prevented, because the component of movement parallel to the fuselage bears an increased risk of damage.

Figure 2:
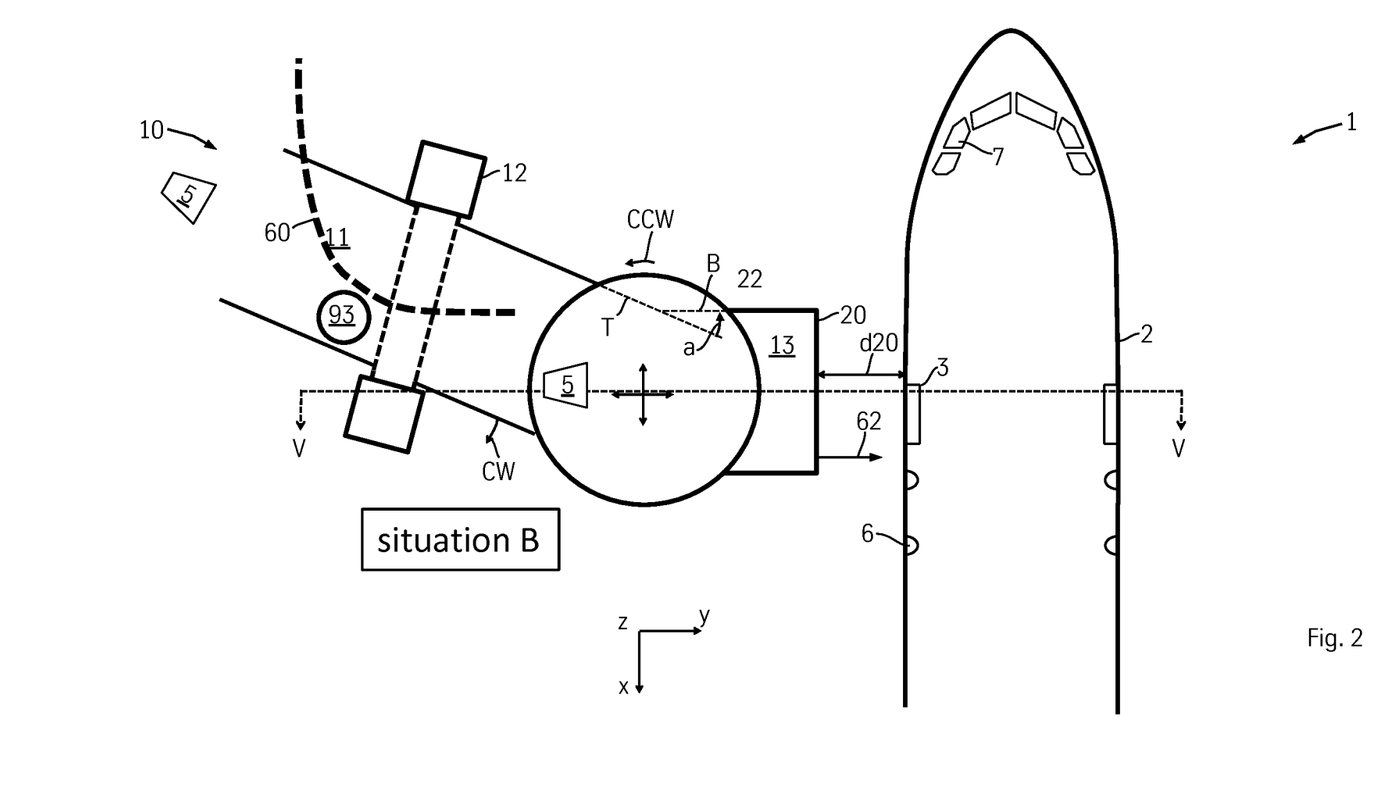
FIG. 2 is a schematic top view of a passenger boarding bridge of the present disclosure located in an intermediate position pulled back from a door of an aircraft.
Figure 3:
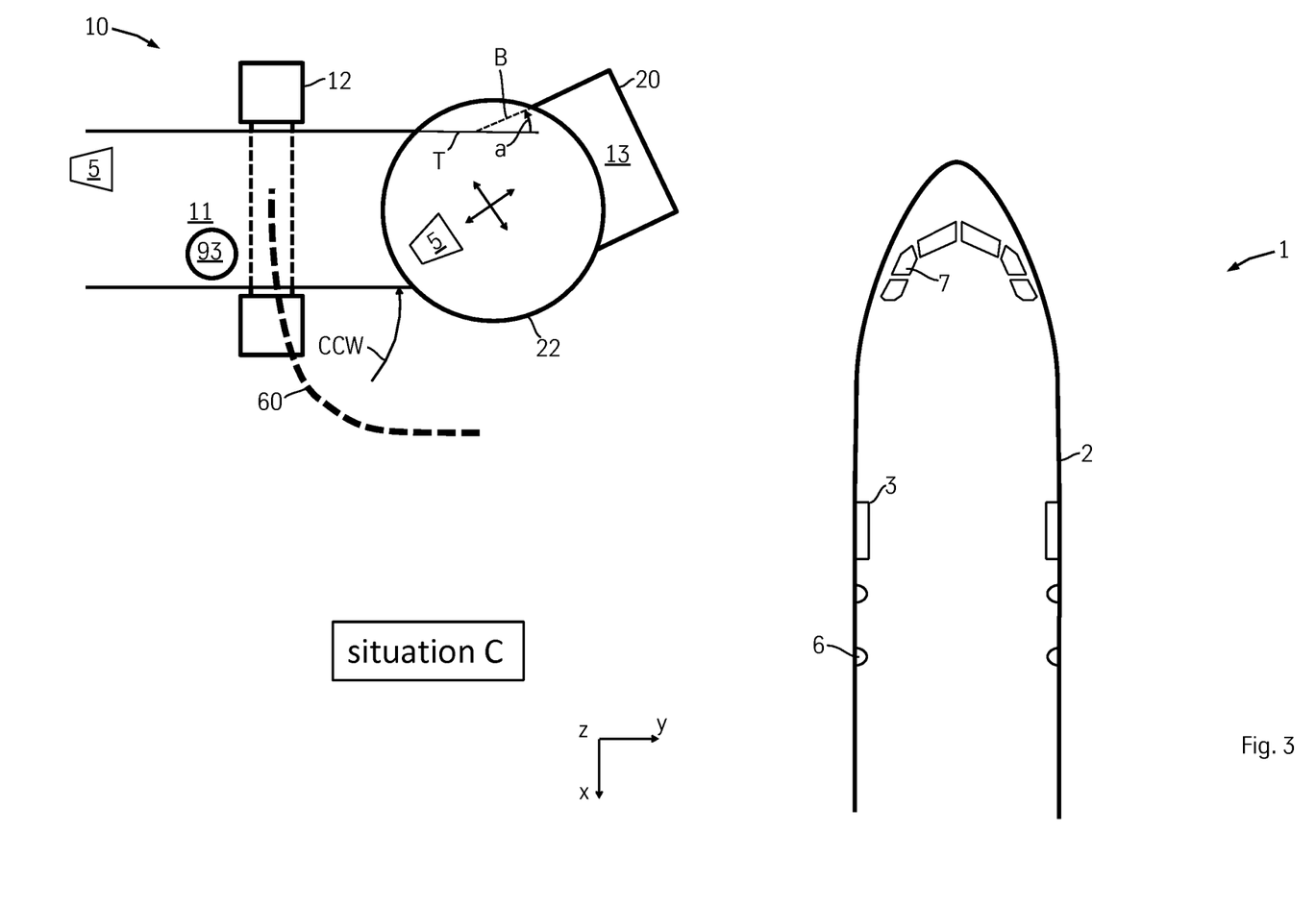
FIG. 3 is a schematic top view of a passenger boarding bridge located in a parked position, according to a first embodiment of the present disclosure.
Figure 4:
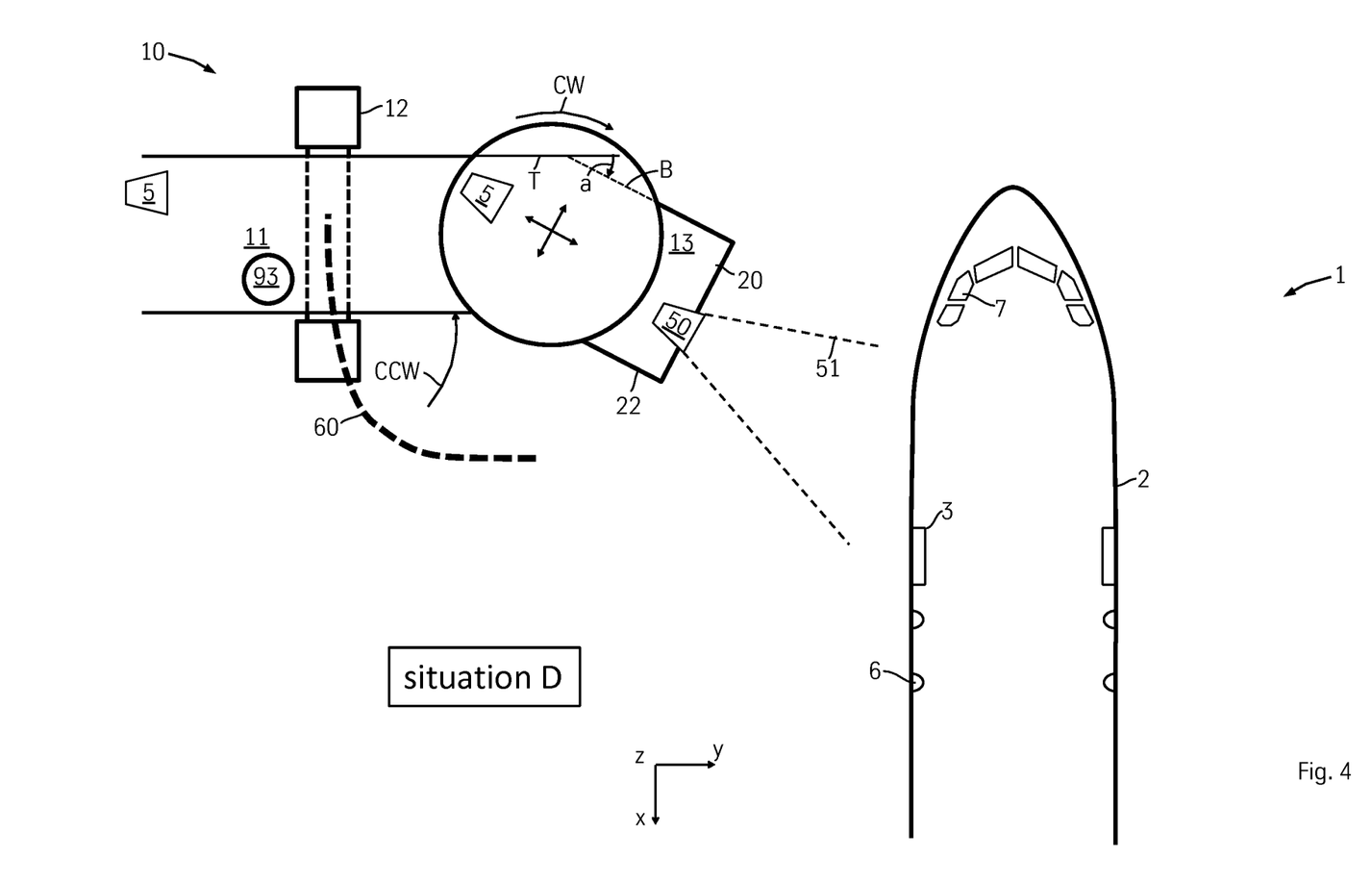
FIG. 4 is a schematic top view of a passenger boarding bridge located in a parked position, according to a second embodiment of the present disclosure.

FIGS. 1 to 4 show a trajectory 60, which is the basis for the movement of the bridgehead 13 from the docked position (situation A in FIG. 1) into a parking position (situation C in FIG. 3 and situation D in FIG. 4). The trajectory 60 represents the positions e.g. of the center of the drive 12, which has to be passed during movement. Here in accordance with the trajectory 60 the bridgehead performs a movement in x and y direction, leading from situation A via situation B to situations C and/or D.

During a first phase A-B (phase between situations A and B), the bridgehead 13 is preferably moved in a manner, that the approaching edge 20 is held in an orientation parallel to the direction F of the fuselage 2, until the approaching edge 20 reaches a distance d20 from the fuselage, of at least a predefined safety distance. The safety distance may be at least 0.5 m. Before the safety distance is reached, no bridgehead movement is allowed which moves the approaching edge 20 out of a parallel alignment with the direction F of fuselage 2 or in a direction, which is not perpendicular to the direction F of the fuselage 2. During this phase the direction T of the tunnel 11 is changing in a small amount, since the tunnel turns around its first end where it is connecting to the terminal building. Consequently during phase A-B a continuing readjustment of the angle a of orientation between the bridgehead 13 and the tunnel 11 is necessary to keep the bridgehead 13 perpendicular to the direction F of fuselage.

In an embodiment, when in situation B the distance d20 has reached the predetermined safety distance, continuing the readjustment of angle a of orientation between the bridgehead 13 and the tunnel 11 can be stopped. So during the further course of undocking into situation C (FIG. 3) the angular orientation a may not change anymore. Consequently the angular orientation a may be identical in situations B and C.

In another embodiment, when in situation B the distance d20 has reached the predetermined safety distance, readjustment of the angular orientation is performed in a different way. For better understanding reference is made to applicants patent application 18 382 372.3, or any later patent application claiming its priority, describing a method for automatic docking. Here a camera based automated docking procedure is described. By means off a camera 50 (see FIG. 4) the position of the door 3 is tracked during a final phase of docking. The docking camera 50 is mounted in an inner area of the bridgehead 13. This is a favored position of the docking camera 50, since in the final phase of the docking the door 3 is as long as possible within the field of view 51. From the description of the parallel patent application it becomes clear, that it is preferred for the automatic docking procedure, that the door 3 comes as early as possible into the field of view of the docking camera 50. Consequently already during undocking in situation B the bridgehead 13 is readjusted so that the door stays in the field of view as long as possible; consequently the direction B of the bridgehead 13 is pointing at the position of the door 3. Sure it is likely, that the position of the aircraft to be docked will be of a different type; however the chances to cover the door of the next aircraft as early as possible within field of view is increased compared to the previously described embodiment of FIG. 3.

Accordingly in this example after situation B the bridgehead 13 is turned clockwise (see arrow CW in FIG. 4), where the tunnel 11 is turned counterclockwise (see arrow CCW in FIG. 4), when viewed in top view.

Now, to support the performance of the docking procedure already during undocking, the direction B of bridgehead 13 is readjusted in a manner, so that the field of view 51 of the docking camera 50 is facing in at least roughly the direction of the door of the recent aircraft.

So during the further course of undocking into situation C (FIG. 3) the angular orientation a may not change anymore. The angular orientation a in situations B and C may be identical.

Figure 7:
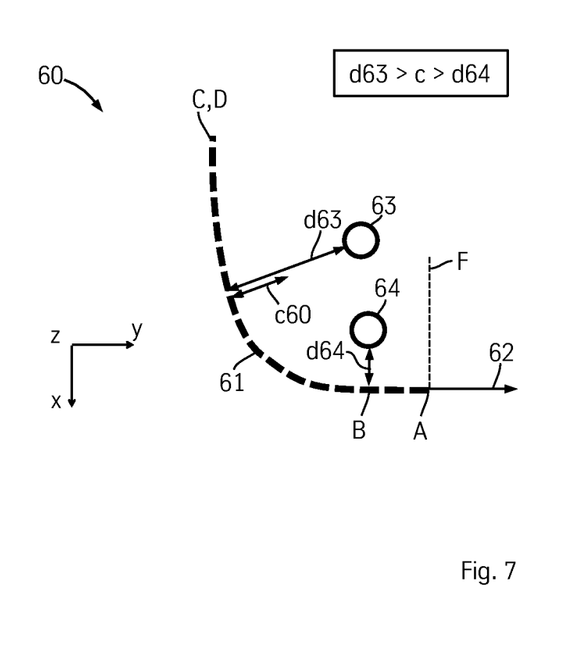
FIG. 7 is a top schematic view showing a trajectory defining a movement of the passenger boarding bridge during an embodiment of an automated undocking procedure of the present disclosure.

FIG. 7 shows a trajectory 60 in top view, which is the basis for the movement of the bridgehead 13. The trajectory comprises in particular a path 61, in particular representing the positions e.g. centers of the drive means 12, which has to be passed during movement. Here in accordance with the trajectory 60 the bridgehead 13 performs a movement in x and y direction, leading from docked situation A via situation B to any of situations C or D, in which the PBB is in a parking position. Additionally the trajectory may comprise an orientation 62 of the bridgehead during 13 at least partially for the course of the path.

In particular in situation the orientation 62 of the bridgehead is perpendicular to the fuselage as shown in FIG. 1. During the first phase of undocking between situations A and B the orientation 62 remains unchanged so that in situation the orientation 62 is still perpendicular to the fuselage 2 as shown in FIG. 2.

The trajectory 60 can also be used for assessing a collision between the PBB 10 and an obstacle. Generally an obstacle may be detected comparing a first image with a second image.

The first image may be a prestored image showing the apron area without any obstacle. The second image is an actual image, showing the current situation of the apron. With the help of picture recognition differences between the two images can be determined. Any object, which is present in the second image, but which is not present in the first image, may be considered as an obstacle.

But not all obstacles in the apron present a problem. Within the scope of the invention, only such obstacles may present a problem, which lie in the area of the trajectory. In FIG. 6 exemplary positions of first and second obstacles 63, 64 are depicted.

The first obstacle 63 has a plan view distance to the trajectory of d63, which is larger than a required minimum clearance distance c60. Consequently first obstacle 63 is not considered as problematic. The second obstacle 64 has a plan view distance to the trajectory of d64, which smaller than a required minimum clearance distance c60. Consequently second obstacle 64 is considered as problematic. The presence of the second obstacle 64 will induce the control unit to switch into a safety mode. In the safety mode, the movement of the PBB may be stopped or at least a warning signal may be issued. It is possible that there are distinct safety mode, to which different clearance distances are allocated.

Figure 9:
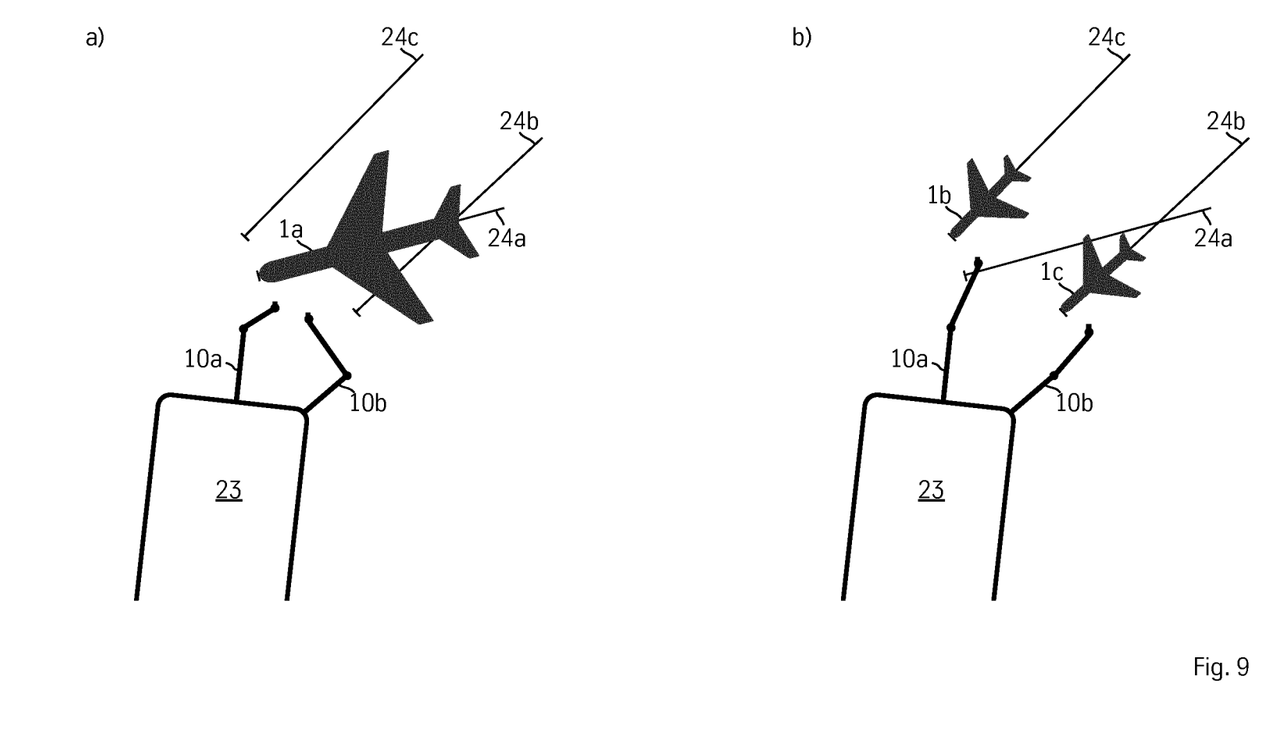
FIG. 9a) is a top schematic view showing an embodiment of an airport gate having a Multiple Apron Ramp System stand with two separate passenger boarding bridges parked at different parking positions, for use with a single parked aircraft.
FIG. 9b) is a top schematic view showing an embodiment of an airport gate having a Multiple Apron Ramp System stand with two separate passenger boarding bridges parked at different parking positions, for use with two separate parked aircraft.

FIG. 9 shows a gate having a Multiple Apron Ramp System (MARS) stand. Here three centerlines 24a-c are provided, which indicate the parking positions for different aircrafts 1a-c. The stand comprises two passenger boarding bridges 10a, 10b, which can connect the aircrafts with a terminal building 23.

FIG. 9a shows a docking situation when a first aircraft 1a is to be docked: The first aircraft 1a is a wide body aircraft, e.g. an Airbus A350. Because of the size if a wide body aircraft is located at the stand no other aircraft can be located at said stand at the same time. The two boarding bridges 10a, 10b are shown in their parking position waiting to for the docking procedure to be started. The first passenger boarding bridge 10a will be docked to the first door, the second passenger boarding bridge 10b will be docked to the second door. Both parking positions are determined in a way, that they provide sufficient clearance to the incoming aircraft one the one hand. One the other hand both parking positions are determined in a way, enabling the docking procedure within a short time.

FIG. 9b shows another docking situation when a second 1b and a third aircraft 1c is to be docked. Both aircrafts are single aisle aircraft, e.g. an Airbus A320 or smaller, which require less space than the wide body aircraft of FIG. 9a, so that two of them can be located at the same time at said stand. The two boarding bridges 10a, 10b are shown in their parking position waiting to for the docking procedure to be started. The first passenger boarding bridge 10a will be docked to aircraft 1b, the second passenger boarding bridge 10b will be docked to aircraft 1c. Both parking positions are determined in a way, that they provide sufficient clearance to the incoming aircrafts one the one hand. One the other hand both parking positions are determined in a way, enabling the docking procedure within a short time.

In particular the parking position is selected from a number of predefined parking positions based on the next docking situation. In particular the selected parking position can be considered as a suitable preposition for the next docking procedure.

The parking positions are different in the situations of FIGS. 9a and 9b, due the docking situation. For example the parked passenger boarding 10b according to FIG. 9b would collide with the incoming and the aircraft 1a of FIG. 9a. To enable improved and situation adaptive parking position during undocking of the previous aircraft the docking situation of the next arriving aircraft is considered. So if the next aircraft is the A350 docked parked on centerline 24a, the PBB are brought into the parking position during the previous undocking movement. For this purpose a flight control system is utilized; here in a database relevant information for the next arriving aircraft is stored. During undocking the information of next arriving aircraft is retrieved and analyzed during, so that during undocking the best parking position for the next docking procedure can be determined.

Figure 11:
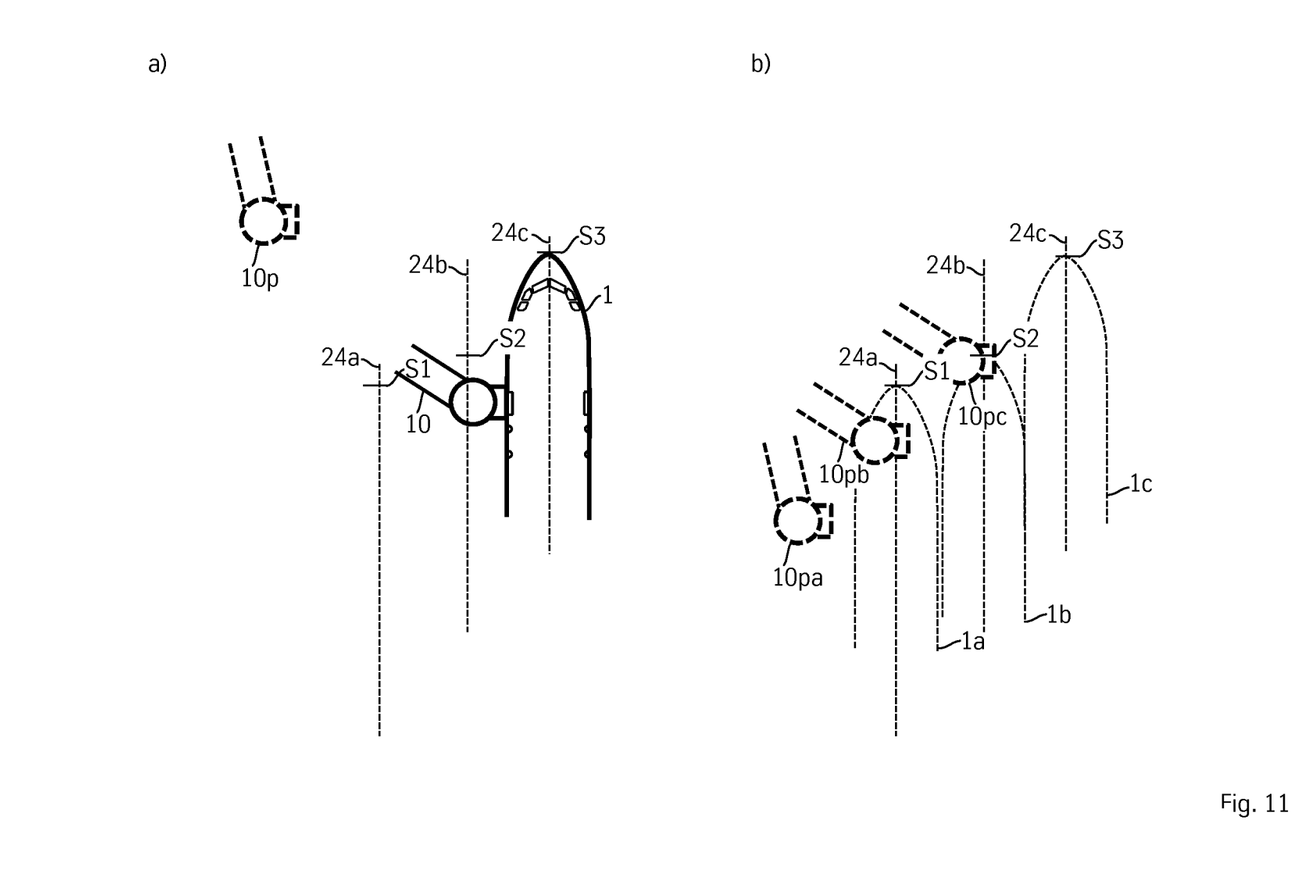
FIG. 11a) is a schematic top view of a passenger boarding bridge docked with an aircraft that is to be undocked therefrom, as disclosed herein.
FIG. 11b) is a schematic top view depicting a passenger boarding bridge and the parking position of successive aircraft in relation to both the previously parked aircraft and the prior position of the passenger boarding bridge for the previously parked aircraft.

FIG. 11 shows also an embodiment of the invention supporting different next docking situations. In FIG. 11a the aircraft to be undocked is located at a certain stop position. The stand has multiple parking positions S1, S2, S3, in particular the parking position S1, S2, S3 are distributed over at least two centerlines 24, 14b, 24c. More than one stop position can be allocated to one centerline.

FIG. 11a shows the aircraft 1 which is currently docked with the PBB 10. The PBB 10 will be undocked. According to the prior art the PBB 10 would be always moved to a general parking position, indicated in dotted lines with 10p. The general parking position 10p is located in a position, where it has sufficient distance to any aircraft independent on which of the plurality of parking position it will be parked.

FIG. 11b shows the improvement of the present invention. Here for illustration purposes aircrafts 1a, 1b, 1c are depicted in dotted lines which indicates an aircraft which will be parked next at the stand, after the aircraft 1 of FIG. 11a has left the stand. As can be seen, the next aircraft can be parked at any of the stop positions S1, S2, S3. Allocated to each of the stop position is an individual parking position of the PBB, indicated with the reference sign 10pa, 10pb, 10pc. It is obvious from the drawing that the overall movement of the PBB can be reduced, thereby reducing the required duration for docking and/or undocking to a minimum amount. Further the movable components of the PBB 10 are subject to significantly lower wear. The method described with FIG. 11 requires that information about the next docking situation is available during conducting the undocking movement. In an embodiment, if none aircraft is expected to arrive at the stand at least for a certain time the PBB 10 can be moved to the general parking position 10p as indicated in FIG. 11a.

Figure 10:
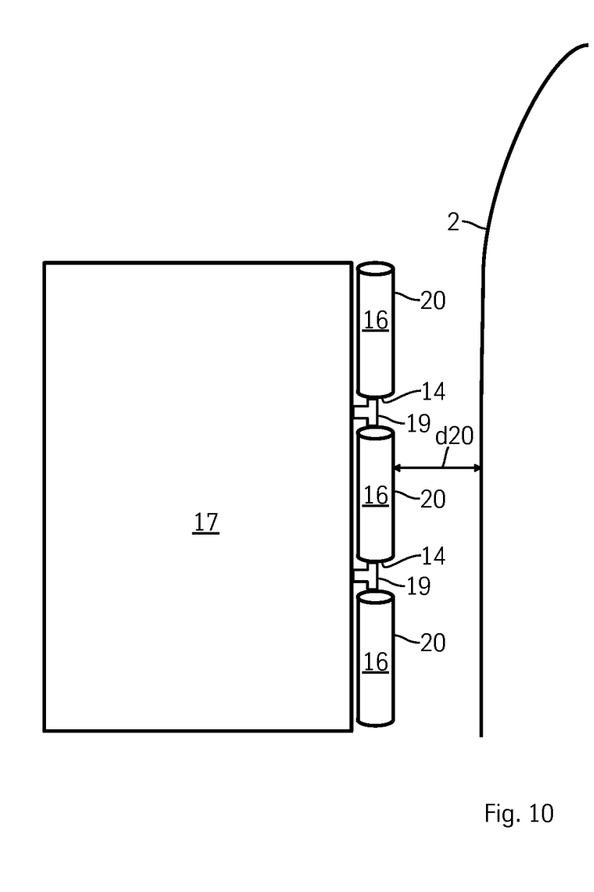
FIG. 10 is a top schematic view of an embodiment of a floor and bumper of the bridgehead of a passenger boarding bridge of the present disclosure.

FIG. 10 shows sensors 19 in located in cavities of the floor bumper 18. The sensors are adapted to measure the distance d20 between the approaching edge and the fuselage. During the undocking movement, the sensors check, whether the bridgehead 13 is really leaving the fuselage 2. In case, the distance d20 is not increasing, the presence of any malfunction is assumed which may to an emergency stop of the drive means. In particular when the distance d20 is reducing during movement there may be a malfunction of the angle sensors of the drive means indication a wrong direction D of drive (see FIG. 1).

LIST OF REFERENCE SIGNS 1 aircraft
2 aircraft fuselage
3 aircraft door
5 observation camera
6 side window
7 cockpit window
10 Passenger boarding bridge
11 tunnel
12 drive means
13 bridgehead
14 cavity 15 canopy
16 canopy bumper
17 floor
18 floor bumper
19 distance sensor
20 approaching edge
21 direction to terminal building
22 round cabin
23 terminal building
24 Centerline
50 automatic docking camera
51 field of view
60 trajectory
61 path
62 orientation
63 first obstacle
64 second obstacle
T direction of tunnel
B direction of bridgehead
D direction of drive means
a angle of orientation between bridgehead relative and tunnel
b angle of orientation between tunnel and drive system
P direction perpendicular to the fuselage
c60 safety distance from trajectory
c10 safety zone within PBB
d20 distance between approaching edge and fuselage
d63, d64 distance between trajectory and object
CW clockwise rotation direction
CCW counterclockwise rotation direction

What is claimed is:

1. A method for automatically undocking a passenger boarding bridge from an aircraft, the aircraft having a fuselage that extends in a longitudinal direction and a door disposed in the fuselage, the passenger boarding bridge being initially located in a docked position and having a bridgehead initially aligned with the door, the method comprising the following steps:
   detecting a start signal to start the undocking procedure;
   in response to detecting the start signal, automatically moving the passenger boarding bridge from the docking position, away from the aircraft by moving the bridgehead in a trajectory that is perpendicular to the longitudinal direction of the fuselage and continuously monitoring a distance between the bridgehead and the fuselage;
   comparing the monitored distance between the bridgehead and the fuselage to a predetermined safety distance from the aircraft to determine whether the monitored distance is less than the predetermined safety distance from the aircraft; and
   in response to the comparison that the monitored distance between the bridgehead and the fuselage is less than the predetermined safety distance from the aircraft, continue automatically moving the passenger boarding bridge from the docking position, away from the aircraft, by moving the bridgehead in the trajectory that is perpendicular to the longitudinal direction of the fuselage and inhibiting movement of the bridgehead in other directions that are not perpendicular to the longitudinal direction of the fuselage while the monitored distance is less than the predetermined safety distance from the aircraft.

2. The method of claim 1, wherein said step of automatically moving the passenger boarding bridge comprises, maintaining an alignment of an approaching edge of the bridgehead parallel to the longitudinal direction of the aircraft fuselage while the bridgehead is moving away from the aircraft and still located within the predetermined safety distance from the aircraft.

3. The method of claim 1, wherein said step of automatically moving the passenger boarding bridge comprises, continuously readjusting an orientation direction of the bridgehead and a direction of a tunnel of the passenger boarding bridge while an approaching edge of the bridgehead is located within the predetermined safety distance from the aircraft, such that an orientation of the approaching edge of the bridgehead is held parallel to the longitudinal direction of the fuselage.

4. The method of claim 1, wherein said step of automatically moving the passenger boarding bridge comprises, moving the bridgehead such that a vertical position of an approaching edge of the bridgehead remains unchanged during movement, when the bridgehead is within the predetermined safety distance from the aircraft.

5. The method of claim 1, wherein the aircraft is a first aircraft, the method further comprising:
   before completing said step of automatic movement of the passenger boarding bridge away from the first aircraft to a parking position, analyzing information from a next plan for docking the passenger boarding bridge to a second aircraft after a departure of the first aircraft from the undocked passenger boarding bridge;
   determining a parking position of the passenger boarding bridge based on the analyzed information from the next docking plan; and
   moving the passenger boarding bridge to the determined parking position.

6. The method of claim 1, further comprising:
   after an approaching edge of the passenger boarding bridge has been moved away from the aircraft to a distance equal to or greater than the predetermined safety distance away from the aircraft,
   rotating a tunnel of the passenger boarding bridge in a first rotation direction to reach a parking position; and
   rotating the bridgehead in a second rotation direction opposite the first rotation direction.

7. The method of claim 1, further comprising:
   observing a safety area of the passenger boarding bridge by a plurality of cameras;
   sending images of the observed safety area from the plurality of cameras to an operator station for review by an operator; and
   issuing an enabling signal to initiate the undocking movement of the passenger boarding bridge.

8. The method of claim 1, further comprising:
   running an observation procedure, during said step of automatically moving the passenger boarding bridge, to detect an object approaching a safety area and issue a warning signal upon detection of the object approaching the safety area.

9. The method of claim 1, further comprising:
   stopping said movement of the passenger boarding bridge if the monitored distance is not increasing.

10. The method of claim 1, further comprising the step of:
    confirming safety conditions before automatically moving the bridgehead from the docked position.

11. The method of claim 1, wherein during said step of automatically moving the passenger boarding bridge further comprises:
    prohibiting movement of the bridgehead which moves an approaching edge of the bridgehead in any direction other than a direction that is perpendicular to the direction of the fuselage when the monitored distance is less than the predetermined safety distance from the aircraft.

12. The method of claim 1, wherein during said step of automatically moving the passenger boarding bridge further comprises:
prohibiting movement of the bridgehead which moves an approaching edge of the bridgehead out of a parallel alignment with the fuselage when the monitored distance is less than the predetermined safety distance from the aircraft.

13. The method of claim 1, wherein the predetermined safety distance from the aircraft is greater than 0.0 meters.

14. The method of claim 1, further comprising:
establishing the trajectory based on the coordinates of a starting position of the passenger boarding bridge and of a parking position of the passenger boarding bridge, wherein the trajectory defines a movement of the passenger boarding bridge; and
moving the passenger boarding bridge from the starting position to the parking position along the established trajectory.

15. The method of claim 14, further comprising:
running an observation procedure, during said step of automatically moving the passenger boarding bridge, to detect an object located within a safety area and issue a warning signal upon detection of the presence of the object in the safety area.

16. The method of claim 15, wherein the safety area comprises future positions of the passenger boarding bridge as determined by the established trajectory.

17. The method of claim 1, further comprising:
before said step of automatically moving the passenger boarding bridge, detecting a first angle between a driving direction of a drive configured to adjust a position of the bridgehead and a direction of a tunnel of the passenger boarding bridge; and
prohibiting movement of the drive when the first angle is outside a predetermined range.

18. The method of claim 17, further comprising:
before said step of automatically moving the passenger boarding bridge, determining a second angle between the driving direction of the drive and a direction perpendicular to the fuselage; and
prohibiting movement of the drive when the second angle exceeds a critical value.

19. The method of claim 1, further comprising the step of:
before said step of automatically moving the passenger boarding bridge, comparing a direction of a drive of the passenger boarding bridge with respect to the longitudinal direction of the fuselage to determine whether an angle difference in the direction of the drive to the longitudinal direction of the fuselage is less than a predetermined range.

20. The method of claim 19, wherein:
the determination of the angle difference in the direction of the drive to the longitudinal direction of the fuselage is less than the predetermined value is by determining an angular orientation between the drive and a tunnel of the passenger boarding bridge and an angular orientation between the tunnel and the bridgehead.

* * * * *

UNITED STATES PATENT AND TRADEMARK OFFICE
CERTIFICATE OF CORRECTION

PATENT NO. : 12,227,304 B2  
APPLICATION NO. : 17/250218  
DATED : February 18, 2025  
INVENTOR(S) : Juan Maria Casado Merino et al.

Page 1 of 1

It is certified that error appears in the above-identified patent and that said Letters Patent is hereby corrected as shown below:

On the Title Page

Item (54) and in the Specification Column 1 Line 1, title, delete "OF" and insert --FOR--, therefor.

Signed and Sealed this  
Thirteenth Day of January, 2026

John A. Squires  
*Director of the United States Patent and Trademark Office*